(12) United States Patent
Uehara et al.

(10) Patent No.: US 9,778,516 B2
(45) Date of Patent: Oct. 3, 2017

(54) LIQUID CRYSTAL OPTICAL DEVICE AND IMAGE DISPLAY DEVICE

(71) Applicant: KABUSHIKI KAISHA TOSHIBA, Tokyo (JP)

(72) Inventors: Shinichi Uehara, Tokyo (JP); Masako Kashiwagi, Kanagawa (JP); Ayako Takagi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 452 days.

(21) Appl. No.: 14/594,251

(22) Filed: Jan. 12, 2015

(65) Prior Publication Data
US 2015/0198848 A1  Jul. 16, 2015

(30) Foreign Application Priority Data

Jan. 14, 2014  (JP) ................................ 2014-004616

(51) Int. Cl.
*G09G 3/36* (2006.01)
*G02F 1/1343* (2006.01)
(Continued)

(52) U.S. Cl.
CPC ... *G02F 1/134309* (2013.01); *G02B 27/2214* (2013.01); *G02F 1/13306* (2013.01); *G02F 1/13439* (2013.01); *G02F 1/29* (2013.01); *G09G 3/3696* (2013.01); *H04N 13/0404* (2013.01); *G02F 2001/294* (2013.01)

(58) Field of Classification Search
CPC .............. G09G 3/3696; G09G 2310/06; G02F 1/134309; G02F 1/133526; G02F 1/29; G02F 2001/294; G02F 2001/133607
See application file for complete search history.

(56) References Cited

U.S. PATENT DOCUMENTS

2011/0228181 A1*  9/2011  Jeong ................... G02B 5/1842
                                                             349/15
2012/0105750 A1*  5/2012  Yoon ...................... G09G 3/003
                                                             349/15
(Continued)

FOREIGN PATENT DOCUMENTS

JP           2012-137662         7/2012

*Primary Examiner* — William Boddie
*Assistant Examiner* — Andrew Schnirel
(74) *Attorney, Agent, or Firm* — Finnegan, Henderson, Farabow, Garrett & Dunner, L.L.P.

(57) ABSTRACT

According to one embodiment, a liquid crystal optical device includes a first substrate unit, a second substrate unit, a liquid crystal layer, and a driver. The first substrate unit includes first electrodes, a second electrode, and a third electrode. The second substrate unit includes an opposing electrode provided on a second surface opposing the first surface. The liquid crystal layer is provided between the first substrate unit and the second substrate unit. The driver sets the first electrodes, the second electrode and the third electrode to a first potential, a second potential and a third potential respectively. A distance between the first electrode and the second electrode is longer than a distance between the second electrode and the third electrode. A difference between the first potential and the second potential is larger than a difference between the second potential and the third potential.

19 Claims, 5 Drawing Sheets

(51) Int. Cl.
*G02F 1/133* (2006.01)
*G02B 27/22* (2006.01)
*G02F 1/29* (2006.01)
*H04N 13/04* (2006.01)

(56) References Cited

U.S. PATENT DOCUMENTS

| | | | |
|---|---|---|---|
| 2012/0162592 A1* | 6/2012 | Takagi | G02B 27/2214 349/139 |
| 2012/0236043 A1* | 9/2012 | Jung | G02B 27/2214 345/690 |
| 2013/0135545 A1* | 5/2013 | Jung | G02F 1/13306 349/33 |
| 2013/0215368 A1* | 8/2013 | Takagi | G02B 27/22 349/138 |
| 2013/0250223 A1* | 9/2013 | Takagi | G02F 1/134336 349/138 |
| 2013/0258218 A1* | 10/2013 | Takagi | G02F 1/1313 349/15 |
| 2014/0049709 A1* | 2/2014 | Kashiwagi | G02F 1/29 349/33 |
| 2014/0063430 A1* | 3/2014 | Kashiwagi | G02B 27/2214 349/139 |
| 2014/0104556 A1* | 4/2014 | Takagi | G02F 1/13306 349/143 |

\* cited by examiner

| $V_{F1}$ | $V_{EA1}$ | $V_{F2}$ | $V_{EA2}$ | $V_E$ | d2:40μm d1:60μm | d2:80μm d1:40μm | d2:60μm d1:60μm | d2:40μm d1:80μm | d2:80μm d1:60μm | d2:70μm d1:70μm | d2:60μm d1:80μm |
|---|---|---|---|---|---|---|---|---|---|---|---|
| 3 | 0 | 3 | 0 | 5 | O | F1 | O | O | F1 | O | O |
| 5 | 0 | 3 | 0 | 5 | F1 | F1 | F1 | F1 | F1 | F1 | F1 |
| 3 | 2 | 3 | 0 | 5 | O | O | O | O | O | O | O |
| 5 | 2 | 3 | 0 | 5 | F1 | F1 | F1 | F1 | F1 | F1 | F1 |
| 3 | 0 | 3 | 0 | 9 | O | F1 | O | O | F1 | O | O |
| 5 | 0 | 3 | 0 | 9 | F1 | F1 | F1 | F1 | F1 | F1 | F1 |
| 3 | 2 | 3 | 0 | 9 | O | O | O | O | O | O | O |
| 5 | 2 | 3 | 0 | 9 | F1 | F1 | F1 | F1 | F1 | F1 | F1 |
| 3 | 0 | 5 | 0 | 5 | O | O | O | F2 | O | O | F2 |
| 5 | 0 | 5 | 0 | 5 | F1 | F1 | O | F1 | F1 | F1 | F1 |
| 3 | 2 | 5 | 0 | 5 | O | O | F2 | F2 | F2 | F2 | F2 |
| 5 | 2 | 5 | 0 | 5 | F1 | F1 | F1 | F1 | F1 | F1 | F1 |
| 3 | 0 | 5 | 0 | 9 | O | O | O | O | O | O | O |
| 5 | 0 | 5 | 0 | 9 | O | F1 | O | F1 | F1 | F1 | O |
| 3 | 2 | 5 | 0 | 9 | O | O | O | O | O | O | O |
| 5 | 2 | 5 | 0 | 9 | O | O | O | F1 | F1 | O | F1 |
| 3 | 0 | 3 | 2 | 5 | O | F1 | O | O | F1 | O | O |
| 5 | 0 | 3 | 2 | 5 | F1 | F1 | F1 | F1 | F1 | F1 | F1 |
| 3 | 2 | 3 | 2 | 5 | O | O | O | O | O | O | O |
| 5 | 2 | 3 | 2 | 5 | F1 | F1 | F1 | F1 | F1 | F1 | F1 |
| 3 | 0 | 3 | 2 | 9 | O | F1 | O | O | F1 | O | O |
| 5 | 0 | 3 | 2 | 9 | O | F1 | F1 | F1 | F1 | F1 | F1 |
| 3 | 2 | 3 | 2 | 9 | O | O | O | O | O | O | O |
| 5 | 2 | 3 | 2 | 9 | O | F1 | F1 | F1 | F1 | F1 | F1 |
| 3 | 0 | 5 | 2 | 5 | O | O | O | O | O | O | O |
| 5 | 0 | 5 | 2 | 5 | O | F1 | O | O | F1 | F1 | O |
| 3 | 2 | 5 | 2 | 5 | O | O | O | O | O | O | F2 |
| 5 | 2 | 5 | 2 | 5 | O | O | O | F2 | O | O | F1 |
| 3 | 0 | 5 | 2 | 9 | O | O | O | O | O | O | O |
| 5 | 0 | 5 | 2 | 9 | O | F1 | O | O | F1 | F1 | O |
| 3 | 2 | 5 | 2 | 9 | O | O | O | O | O | O | O |
| 5 | 2 | 5 | 2 | 9 | O | O | O | O | O | O | O |

LIQUID CRYSTAL OPTICAL DEVICE AND IMAGE DISPLAY DEVICE

CROSS-REFERENCE TO RELATED APPLICATIONS

This application is based upon and claims the benefit of priority from Japanese Patent Application No. 2014-004616, filed on Jan. 14, 2014; the entire contents of which are incorporated herein by reference.

FIELD

Embodiments described herein relate generally to a liquid crystal optical device and an image display device.

BACKGROUND

A liquid crystal optical device is known in which the distribution of the refractive index is changed according to the application of a voltage by utilizing the birefringence of liquid crystal molecules. Also, there is a stereoscopic image display device in which such a liquid crystal optical device is combined with an image display unit.

By changing the distribution of the refractive index of the liquid crystal optical device, the stereoscopic image display device switches between a state in which the image displayed by the image display unit is caused to be incident on the eyes of a viewer as displayed by the image display unit and a state in which the image displayed by the image display unit is caused to be incident on the eyes of the viewer as multiple parallax images. Thereby, a two-dimensional image display operation and a three-dimensional image display operation are performed. Also, there are examples in which the distribution of the refractive index is set to have a Fresnel lens-like configuration in such a liquid crystal optical device. In such a liquid crystal optical device, it is desirable to obtain high-quality optical characteristics by controlling the refractive index distribution to have the desired characteristics.

DETAILED DESCRIPTION

According to one embodiment, a liquid crystal optical device includes a first substrate unit, a second substrate unit, a liquid crystal layer, and a driver. The first substrate unit includes a first substrate and a plurality of first electrode, a second electrode and a third electrode. The first substrate has a first surface. The first electrodes are provided on the first surface and arranged in a first direction. The second electrode is provided between one electrode of most proximal first electrodes of the plurality of first electrodes and a midpoint of a line segment. The line segment connects a first center in the first direction of the one electrode and a center in the first direction of other electrode of the most proximal first electrodes. The third electrode is provided between the second electrode and the midpoint. The second substrate unit includes a second substrate and an opposing electrode. The second electrode has a second surface opposing the first surface. The opposing electrode is provided on the second surface. The liquid crystal layer is provided between the first substrate unit and the second substrate unit. The driver sets the opposing electrode to an opposing potential, sets each of the plurality of first electrodes to a first potential, sets the second electrode to a second potential, and sets the third electrode to a third potential. A first distance along the first direction between the first center and a second center in the first direction of the second electrode is longer than a second distance along the first direction between the second center and a third center in the first direction of the third electrode. A difference between an absolute value of a first potential difference and an absolute value of a second potential difference is larger than a difference between the absolute value of the second potential difference and an absolute value of a third potential difference. The first potential difference is a difference between the first potential and the opposing potential. The second potential difference is a difference between the second potential and the opposing potential. The third potential difference is a difference between the third potential and the opposing potential.

According to one embodiment, a liquid crystal optical device includes a first substrate unit, a second substrate unit, a liquid crystal layer, and a driver. The first substrate unit includes a first substrate, a plurality of first electrode, a second electrode, a third electrode, and a fourth electrode. The first substrate has a first surface. The first electrodes are provided on the first surface and arranged in a first direction. The second electrode is provided between one electrode of most proximal first electrodes of the plurality of first electrodes and a midpoint of a line segment. The line segment connects a first center in the first direction of the one electrode and a center in the first direction of the other electrode of the most proximal first electrodes. The third electrode is provided between the second electrode and the midpoint. The fourth electrode is provided between the third electrode and the midpoint. The second substrate unit includes a second substrate and an opposing electrode. The second substrate has a second surface opposing the first surface. The opposing electrode is provided on the second surface. The liquid crystal layer is provided between the first substrate unit and the second substrate unit. The driver sets the opposing electrode to an opposing potential, setting each of the plurality of first electrodes to a first potential, setting the second electrode to a second potential, setting the third electrode to a third potential, and setting the fourth electrode to a fourth potential. A second distance along the first direction between a second center in the first direction of the second electrode and a third center in the first direction of the third electrode is longer than a third distance along the first direction between the third center and a fourth center in the first direction of the fourth electrode. A difference between an absolute value of a second potential difference and an absolute value of a third potential difference is larger than a difference between the absolute value of the third potential difference and an absolute value of a fourth potential difference. The second potential difference is a difference between the second potential and the opposing potential. The third potential difference is a difference between the third potential and the opposing potential. The fourth potential difference is a difference between the fourth potential and the opposing potential.

According to one embodiment, a liquid crystal optical device includes a first substrate unit, a second substrate unit, a liquid crystal layer, and a driver. The first substrate unit includes a first substrate, a plurality of first electrodes, a second electrode, a third electrode, a first supplemental electrode, and a second supplemental electrode. The first substrate has a first surface. The first electrodes are provided on the first surface and arranged in a first direction. The second electrode is provided between one electrode of most proximal first electrodes of the plurality of first electrodes and a midpoint of a line segment. The line segment connects a first center in the first direction of the one electrode and a center in the first direction of the other electrode of the most proximal first electrodes. The third electrode is provided between the second electrode and the midpoint. The first supplemental electrode is provided between the one electrode and the second electrode. The second supplemental electrode is provided between the second electrode and the third electrode. The second substrate unit includes a second substrate and an opposing electrode. The second substrate has a second surface opposing the first surface. The opposing electrode is provided on the second surface. The liquid crystal layer is provided between the first substrate unit and the second substrate unit. The driver sets the opposing electrode to an opposing potential, sets each of the plurality of first electrodes to a first potential, sets the second electrode to a second potential, and sets the third electrode to a third potential. The liquid crystal layer includes a first portion and a second portion. The first portion is provided between the first supplemental electrode and the opposing electrode. The second portion is provided between the second supplemental electrode and the opposing electrode. A refractive index of at least a portion of the first portion is higher than a refractive index of the second portion.

According to one embodiment, an image display device includes one of the liquid crystal optical devices recited above and a display unit stacked with the liquid crystal optical device. The display unit causes light including image information to be incident on the liquid crystal layer.

Various embodiments will be described hereinafter with respect to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the specification and drawings of the application, components similar to those described in regard to a drawing thereinabove are marked with like reference numerals, and a detailed description is omitted as appropriate.

Figure 1:
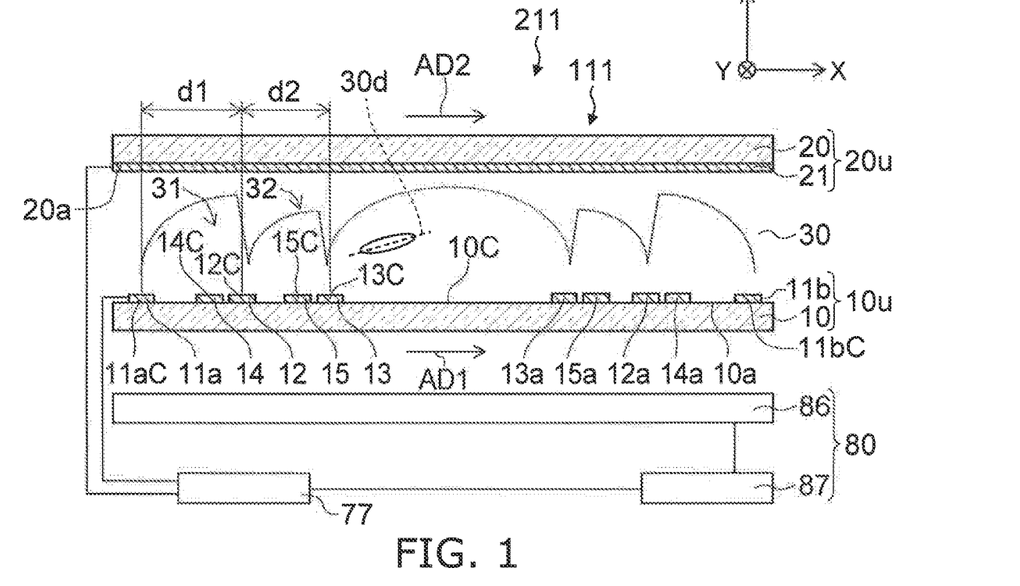
FIG. 1 is a schematic view illustrating a liquid crystal optical device according to a first embodiment.

FIG. 1 is a schematic view illustrating a liquid crystal optical device according to a first embodiment.

Figure 2:
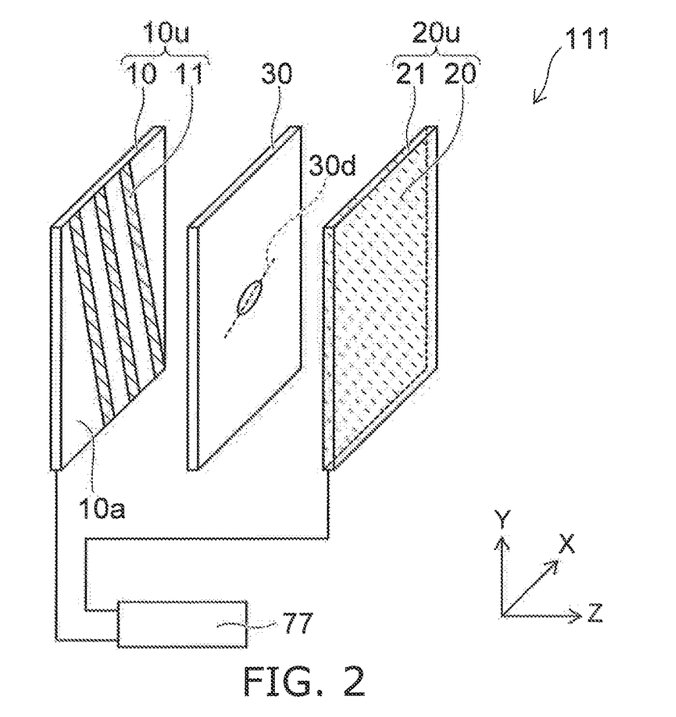
FIG. 2 is a schematic perspective view illustrating the liquid crystal optical device according to the first embodiment.

FIG. 2 is a schematic perspective view illustrating the liquid crystal optical device according to the first embodiment.

As shown in FIG. 1 and FIG. 2, the liquid crystal optical device 111 according to the embodiment includes a first substrate unit 10$u$, a second substrate unit 20$u$, a liquid crystal layer 30, and a driver 77.

The first substrate unit 10$u$ includes a first substrate 10, multiple first electrodes 11, a second electrode 12, and a third electrode 13. In the example, a first supplemental electrode 14 and a second supplemental electrode 15 are further provided.

The first substrate 10 has a first surface 10$a$. The multiple first electrodes 11, the second electrode 12, the third electrode 13, the first supplemental electrode 14, and the second supplemental electrode 15 are provided on the first surface 10$a$. In FIG. 1 and FIG. 2, some of the electrodes are not shown for easier viewing of the drawings.

For example, the multiple first electrodes 11 are provided on the first surface 10$a$ and are arranged in a first direction. For example, the multiple first electrodes 11 include two first electrodes 11 most proximal to each other. The most proximal first electrodes 11 include one first electrode 11$a$ and the other first electrode 11$b$.

The direction from the one first electrode 11$a$ toward the other first electrode 11$b$ corresponds to the first direction. The first direction is taken as an X-axis direction. A direction parallel to the first surface and perpendicular to the X-axis direction is taken as a Y-axis direction. A direction perpendicular to the X-axis direction and perpendicular to the Y-axis direction is taken as a Z-axis direction.

The direction from the first electrode 11$a$ toward the first electrode 11$b$ is taken as the +X direction. The direction from the first electrode 11$b$ toward the first electrode 11$a$ is taken as the −X direction.

For example, the multiple first electrodes 11, the second electrode 12, the third electrode 13, the first supplemental electrode 14, and the second supplemental electrode 15 extend along a second direction (e.g., the Y-axis direction) intersecting the X-axis direction.

A midpoint 10C is between the center (a first center 11$a$C) in the X-axis direction of the one first electrode 11$a$ and a center 11$b$C in the X-axis direction of the other first electrode 11$b$. The midpoint 10C is the midpoint of the line segment connecting the first center 11$a$C and the center 11$b$C.

The second electrode 12 is provided between the midpoint 10C and the one first electrode 11$a$. The third electrode 13 is provided between the second electrode 12 and the midpoint 10C. The first supplemental electrode 14 is provided between the first electrode 11 and the second electrode 12. The second supplemental electrode 15 is provided between the second electrode 12 and the third electrode 13.

The second substrate unit 20$u$ includes a second substrate 20 and an opposing electrode 21. The second substrate 20 has a second surface 20$a$ opposing the first surface 10$a$. The opposing electrode 21 is provided on the second surface 20$a$.

In the specification, the state of being opposed includes not only the state of directly facing each other but also the state of facing each other with another component inserted therebetween.

The liquid crystal layer 30 is provided between the first substrate unit 10$u$ and the second substrate unit 20$u$. The second surface 20$a$ is the surface of the second substrate 20 on the liquid crystal layer 30 side. The liquid crystal layer 30 includes a liquid crystal material. The liquid crystal layer 30 includes multiple liquid crystal molecules.

A nematic liquid crystal (having a nematic phase at the temperature of use of the liquid crystal optical device 111) is used as the liquid crystal material. The liquid crystal material has a positive dielectric anisotropy. The initial alignment of the liquid crystal of the liquid crystal layer 30 (the alignment when a voltage is not applied to the liquid crystal layer 30) is, for example, the horizontal direction.

The driver 77 is electrically connected to the opposing electrode 21, the multiple first electrodes 11, the second electrode 12, the third electrode 13, the first supplemental electrode 14, and the second supplemental electrode 15. In FIG. 1 and FIG. 2, some of the interconnects between the driver 77 and the electrodes are not shown for easier viewing of the drawings.

The driver 77 applies voltages to each of the electrodes. In other words, the driver 77 sets each of the electrodes to a prescribed potential. For example, the driver 77 sets each of the multiple first electrodes 11 to a first potential, sets the second electrode to a second potential, sets the third electrode to a third potential, and sets the opposing electrode 21 to an opposing potential. Further, the driver 77 sets the first supplemental electrode 14 to a first supplemental potential and sets the second supplemental electrode 15 to a second supplemental potential.

For convenience in the specification, the state in which the potentials are set to be the same between two electrodes (zero volts) also is included in the state in which a voltage is applied.

For example, the materials and/or configurations of the multiple first electrodes 11, the second electrode 12, the third electrode 13, the first supplemental electrode 14, and the second supplemental electrode 15 may be the same or may be different from each other. The electrodes that are set to the first potential are used as the multiple first electrodes 11. For example, the electrode that is set to the second potential which is different from the first potential is used as the second electrode 12. Similarly, the multiple first electrodes 11, the second electrode 12, the third electrode 13, the first supplemental electrode 14, and the second supplemental electrode 15 may be determined according to the dispositions at which the electrodes are provided and the potentials to which the electrodes are set.

The voltage that is applied (the potential that is set) for each of the electrodes is controlled by the driver 77. Thereby, the refractive index distribution of the liquid crystal layer 30 is changed by controlling the alignment of the multiple liquid crystal molecules included in the liquid crystal layer 30. For example, the refractive index distribution of the liquid crystal layer 30 is changed in a lens configuration. A lens is formed by the distribution of the refractive index. Thereby, for example, a three-dimensional image display is performed by using the lens with an image display unit 80 described below. The refractive index distribution is set to have, for example, a Fresnel lens-like configuration. Thereby, the thickness of the liquid crystal layer 30 can be thin.

For example, electrodes (lens edge electrodes) are disposed at positions corresponding to the end portions of the Fresnel lens. Electrodes (Fresnel electrodes) are disposed at positions corresponding to the valley portions (the portions of minimum values) of the jump portions of the Fresnel lens. Electrodes (auxiliary electrodes) are disposed at positions corresponding to the hill portions (the portions of maximum values) of the jump portions of the Fresnel lens. The refractive index distribution having the Fresnel lens-like configuration can be obtained by controlling the voltages applied to each of the electrodes.

The refractive index distributions of the lens edge portions are formed by the lens edge electrodes. For example, the valleys (the minimum values) of the jumps are formed in the refractive index distribution by the Fresnel electrodes. For example, the hills (the maximum values) of the jumps are formed in the refractive index distribution by the auxiliary electrodes.

For example, the first electrodes 11 are used as the lens edge electrodes. The second electrode 12 and the third electrode 13 are used as the Fresnel electrodes. The first supplemental electrode 14 and the second supplemental electrode 15 are used as the auxiliary electrodes.

For example, the first substrate unit 10u may further include a fifth electrode 12a, a sixth electrode 13a, a fourth supplemental electrode 14a, and a fifth supplemental electrode 15a. For example, the fifth electrode 12a is provided between the midpoint 10C and the other first electrode 11b. The sixth electrode 13a is provided between the fifth electrode 12a and the midpoint 10C. The fourth supplemental electrode 14a is provided between the first electrode 11b and the fifth electrode 12a. The fifth supplemental electrode 15a is provided between the fifth electrode 12a and the sixth electrode 13a.

In the embodiment, for example, a refractive index distribution that has a Fresnel lens-like configuration is formed in the liquid crystal layer 30. The number of the jump portions in the refractive index distribution having the Fresnel lens-like configuration is two or more. In the embodiment, one pair of lens edge electrodes (e.g., the first electrodes 11a and 11b) is provided to be arranged along the X-axis direction. For example, at least four Fresnel electrodes and at least four auxiliary electrodes are disposed between the one pair of lens edge electrodes. For example, an auxiliary electrode (e.g., the first supplemental electrode 14) is disposed to be adjacent to a lens edge electrode (e.g., the first electrode 11a). Further, a Fresnel electrode (e.g., the second electrode 12), an auxiliary electrode (e.g., the second supplemental electrode 15), and a Fresnel electrode (e.g., the third electrode 13) are disposed in this order from the lens edge electrode toward the center of the lens. Further, a Fresnel electrode (e.g., the sixth electrode 13a), an auxiliary electrode (e.g., the fifth supplemental electrode 15a), a Fresnel electrode (e.g., the fifth electrode 12a), an auxiliary electrode (e.g., the fourth supplemental electrode 14a), and another lens edge electrode (e.g., the first electrode 11b) are disposed in this order from the lens center toward the other lens edge.

The first substrate 10 and the second substrate 20 are transmissive to light. For example, the first substrate 10 and the second substrate 20 are transparent to visible light. The first substrate 10 and the second substrate 20 include, for example, a transparent material such as glass, a resin, etc. The first substrate 10 and the second substrate 20 have, for example, plate configurations or sheet configurations. The thickness of the first substrate 10 is, for example, not less than 50 micrometers (μm) and not more than 2000 μm. In the embodiment, the thickness of the first substrate 10 is arbitrary.

The opposing electrode 21, the multiple first electrodes 11, the second electrode 12, the third electrode 13, the first supplemental electrode 14, and the second supplemental electrode 15 include, for example, an oxide including at least one (one type) of element selected from the group consisting of indium (In), tin (Sn), zinc (Zn), and titanium (Ti). These electrodes include, for example, ITO. Thereby, for example, the light transmissivity for visible light is obtained. For example, at least one selected from $In_2O_3$ and $SnO_3$ may be used. The thicknesses of the opposing electrode 21, the multiple first electrodes 11, the second electrode 12, the third electrode 13, the first supplemental electrode 14, and the second supplemental electrode 15 are, for example, not less than 10 nanometers (nm) and not more than 350 nm. For example, the thicknesses are about 50 nm. The thicknesses may be about 200 nm. The thicknesses of the electrodes are set to be, for example, thicknesses at which a high transmittance for visible light is obtained.

The disposition pitch of the lens edge electrodes (e.g., the distance between the first center 11aC and the center 11bC) is, for example, not less than 100 μm and not more than 1000 μm. The disposition pitch is set to match the desired specifications (the characteristics of the gradient index lens described below). The length (the width) along the X-axis direction of the lens edge electrode is, for example, not less than 5 μm and not more than 50 μm. The length (the width) along the X-axis direction of the Fresnel electrode is, for example, not less than 5 μm and not more than 50 μm. The length (the width) along the X-axis direction of the auxiliary electrode is, for example, not less than 5 μm and not more than 50 μm.

For example, the width (the length along the X-axis direction) of the first electrode 11, the width (the length along the X-axis direction) of the second electrode 12, and the width (the length along the X-axis direction) of the third electrode are about 10 μm each.

For example, the distance (a first distance d1) along the X-axis direction between the first center 11aC and the center (a second center 12C) in the X-axis direction of the second electrode 12 is longer than the distance (a second distance d2) along the X-axis direction between the second center 12C and the center (a third center 13C) in the X-axis direction of the third electrode 13.

The distance between the first center 11aC and the second center 12C is, for example, not less than 20 μm and not more than 100 μm. In the example, the distance between the first center 11aC and the second center 12C is 80 μm. The distance between the third center 13C and the second center 12C is, for example, not less than 20 μm and not more than 100 μm. In the example, the distance is 40 μm.

In other words, in the example, the first distance d1 between the center of the lens edge electrode (e.g., the first electrode 11) and the center of the Fresnel electrode (e.g., the second electrode 12) adjacent to the lens edge electrode is longer than the second distance d2 between the center of the second electrode 12 and the center of the Fresnel electrode (e.g., the third electrode 13) adjacent to the second electrode 12.

The distance along the X-axis direction between the second center 12C and the center (a first supplemental center 14C) in the X-axis direction of the first supplemental electrode 14 is, for example, 5 μm. The distance along the X-axis direction between the third center 13C and the center (a second supplemental center 15C) in the X-axis direction of the second supplemental electrode 15 is, for example, 5 μm. The distance along the X-axis direction between the first supplemental center 14C and the first center 11aC is longer than the distance along the X-axis direction between the first supplemental center 14C and the second center 12C.

For example, the width of the third electrode 13 is narrower than the width of the second electrode 12. The width (the length along the X-axis direction) of the second supplemental electrode 15 is narrower than the width (the length along the X-axis direction) of the first supplemental electrode 14. For example, the width of the second electrode 12 is narrower than the width of the first supplemental electrode 14. For example, the width of the Fresnel electrode becomes narrower as the Fresnel electrode becomes distal to the lens edge electrode. The width of the auxiliary electrode becomes narrower as the auxiliary electrode becomes distal to the lens edge electrode.

For example, the distance (the first distance d1) along the X-axis direction between the first center 11aC and the center (the second center 12C) in the X-axis direction of the second electrode 12 is longer than the distance (the second distance d2) along the X-axis direction between the second center 12C and the center (the third center 13C) in the X-axis direction of the third electrode 13.

The thickness of the liquid crystal layer 30 (the length along the Z-axis direction of the liquid crystal layer 30) is, for example, not less than 10 μm and not more than 60 μm, e.g., about 30 μm. The thickness of the liquid crystal layer 30 is the distance along the Z-axis direction between the first substrate unit 10u and the second substrate unit 20u.

For example, in the embodiment, the alignment of the liquid crystal of the liquid crystal layer 30 has a pretilt. The pretilt is the tilt with respect to the X-Y plane of a long axis 30d (the director) of the liquid crystal molecules in the initial alignment (the state in which voltages are not applied to the electrodes). The pretilt angle is the angle between the X-Y plane and the long axis 30d of the liquid crystal molecules. In the case of a "horizontal alignment," the pretilt angle is, for example, greater than 0° but less than 45°. In the specification, the case of the pretilt angle being less than 45° is called the horizontal alignment for convenience. In the case where a nematic liquid crystal is used as the liquid crystal layer 30, the long axis 30d of the liquid crystal molecules corresponds to the direction (the axis) in which the anisotropy is large.

The direction of the pretilt (the direction of the director in the initial alignment) can be determined by, for example, a crystal rotation method, etc. Also, the direction of the pretilt can be determined by changing the alignment of the liquid crystal by applying a voltage to the liquid crystal layer 30 and by observing the optical characteristics of the liquid crystal layer 30 at this time.

A direction AD1 of the alignment processing is along, for example, the X-axis direction in the case where alignment processing of the first substrate unit 10u is performed by, for example, rubbing, etc. In the example, the direction AD1 of the alignment processing of the first substrate unit 10u is, for example, the +X direction. The direction AD1 of the alignment processing may be tilted with respect to the X-axis direction.

When the long axis 30d of the liquid crystal molecules is projected onto the X-Y plane, the long axis 30d may be parallel to or tilted with respect to the X-axis direction. When the direction of the pretilt is projected onto the X-axis, the direction of the pretilt has an X-axis direction component. For example, when projected onto the X-Y plane, the angle between the first direction (the X-axis direction) and the long-axis direction of the liquid crystal molecules of the liquid crystal layer 30 is smaller than the angle between the second direction (the Y-axis direction) and the long-axis direction of the liquid crystal molecules.

For example, the alignment direction of the liquid crystal layer 30 at the vicinity of the second substrate unit 20u is parallel to the alignment direction of the liquid crystal layer 30 at the vicinity of the first substrate unit 10u. In the example, a direction AD2 of the alignment processing of the second substrate unit 20u is the +X direction. In the liquid crystal layer 30, the liquid crystal alignment may be twisted along the Z-axis direction.

The first substrate unit 10u may further include an alignment film. The alignment film aligns the liquid crystal molecules. The lens edge electrode, the Fresnel electrode, and the auxiliary electrode are disposed between the first substrate 10 and the alignment film of the first substrate unit 10u. The second substrate unit 20u may further include an alignment film. The opposing electrode 21 is disposed between the second substrate 20 and the alignment film of the second substrate unit 20u. The alignment films include, for example, polyimide. The initial alignment of the liquid crystal layer 30 is obtained by, for example, performing rubbing of the alignment films. The initial alignment may be obtained by performing light irradiation of the alignment films. In the example, the dielectric anisotropy of the liquid crystal included in the liquid crystal layer 30 is positive; and the initial alignment is the horizontal direction.

The liquid crystal optical device 111 is used with the image display unit 80. An image display device 211 according to the embodiment includes the image display unit 80 and any liquid crystal optical device (in the example, the liquid crystal optical device 111) according to the embodiment. Any display device may be used as the image display unit 80. For example, a liquid crystal display device, an organic EL display device, a plasma display, etc., may be used.

The liquid crystal alignment of the liquid crystal layer 30 is changed by applying voltages between the opposing electrode 21 and each of the multiple first electrodes 11, the second electrode 12, the third electrode 13, the first supplemental electrode 14, and the second supplemental electrode 15. A refractive index distribution is formed in the liquid crystal layer 30 according to the change. The travel direction of the light incident on the liquid crystal optical device 111 is changed by the refractive index distribution. The change of the travel direction of the light is mainly based on the refraction effect.

The image display unit 80 includes a display unit 86. The display unit 86 is stacked with the liquid crystal optical device 111. The display unit 86 causes light including image information to be incident on the liquid crystal layer 30. The image display unit 80 may further include a display controller 87 that controls the display unit 86. A signal that includes the image information is supplied from the display controller 87 to the display unit 86. The display unit 86 produces light that is modulated based on the signal. For example, the display unit 86 emits light including multiple parallax images. As described below, the liquid crystal optical device 111 has an operating state in which the optical path is modified, and an operating state in which the optical path is substantially not modified. The image display device 211 provides, for example, a three-dimensional display by the light being incident on the liquid crystal optical device 111 in the operating state in which the optical path is modified. Also, the image display device 211 provides, for example, a two-dimensional image display in the operating state in which, for example, the optical path substantially is not modified.

The driver 77 may be connected to the display controller 87 by a wired or wireless method (an electrical method, an optical method, etc.). The image display device 211 may further include a controller that controls the driver 77 and the display controller 87.

The voltage applied to each of the electrodes may be a direct-current voltage or an alternating current voltage. For example, the polarity of the first potential may change periodically. For example, the opposing potential may be fixed; and a first potential of alternating current may be used. The polarity of the opposing potential may be changed periodically; and the first potential may be changed in conjunction with the change of the polarity of the opposing potential but with the reverse polarity. In other words, common inversion driving may be performed. Thereby, the power supply voltage of the drive circuit can be low; and the breakdown voltage specifications of the drive IC are relaxed.

For example, the opposing electrode 21 is 0 V. An alternating current voltage having a rectangular wave configuration having an effective voltage value of 5 V is applied to the first electrodes 11. For example, 0 V is applied to the first supplemental electrode 14. For example, 0 V is applied to the second supplemental electrode 15. An alternating current voltage having a rectangular wave configuration having an effective voltage value of 3 V is applied to the second electrode 12. An alternating current voltage having a rectangular wave configuration having an effective voltage value of 3 V is applied to the third electrode 13.

The difference (a first voltage difference) between the effective value of the voltage (which may be the first potential difference) applied between the opposing electrode 21 and the lens edge electrode (e.g., the first electrode 11) and the effective value of the voltage (which may be a second potential difference) applied between the opposing electrode 21 and the Fresnel electrode (e.g., the second electrode 12) disposed to be adjacent to the lens edge electrode is 2 V in the example. On the other hand, the difference (a second voltage difference) between the effective value of the voltage (which may be the second potential difference) applied between the opposing electrode 21 and the Fresnel electrode (e.g., the second electrode 12) and the effective value of the voltage (which may be the third potential difference) applied between the opposing electrode 21 and the Fresnel electrode (e.g., the third electrode 13) disposed to be adjacent to the Fresnel electrode is 0 V. In other words, the first voltage difference is larger than the second voltage difference.

The effective value of the voltage applied between the lens edge electrode and the opposing electrode 21 is the largest. Compared to the lens edge electrode, the effective value of the voltage applied between the opposing electrode 21 and each of the Fresnel electrodes is small.

For example, the distance between the lens edge electrode and the first Fresnel electrode adjacent to the lens edge electrode is set to be longer than the distance between the first Fresnel electrode and the second Fresnel electrode adjacent to the first Fresnel electrode; and for the lens edge electrode and the Fresnel electrodes, the difference between the effective values of the voltages of the adjacent electrodes is set to be larger as the distance between the adjacent electrodes increases.

In the embodiment, in the case where the first distance d1 between the second center 12C and the first center 11aC is longer than the second distance d2 between the third center 13C and the second center 12C, the difference between the absolute value of the difference (the first potential difference) between the first potential and the opposing potential and the absolute value of the difference (the second potential difference) between the second potential and the opposing potential is set to be larger than the difference between the absolute value of the second potential difference and the absolute value of the difference (the third potential difference) between the third potential and the opposing potential.

Thereby, the occurrence of disclinations described below can be suppressed.

Conversely, as described below, the distance (the second distance d2) along the X-axis direction between the second center 12C and the third center 13C may be longer than the distance (the first distance d1) along the X-axis direction between the first center 11aC and the second center 12C; and the difference between the absolute value of the second potential difference and the absolute value of the third potential difference may be larger than the difference between the absolute value of the first potential difference and the absolute value of the second potential difference. In such a case as well, the occurrence of the disclinations can be suppressed.

In the example, the first distance d1 between the second center 12C and the first center 11aC is longer than the second distance d2 between the third center 13C and the second center 12C; and the difference between the absolute value of the first potential difference and the absolute value of the second potential difference is larger than the difference between the absolute value of the second potential difference and the absolute value of the third potential difference.

An example of the operations of the embodiment will now be described. In the region of the first electrode 11 vicinity, by the voltage described above being applied to the first electrode 11, the liquid crystal alignment of the liquid crystal layer 30 changes; and the tilt angle of the liquid crystal becomes large. For example, a vertical alignment is formed in, for example, this region. The effective refractive index of this region approaches the refractive index (n0) for ordinary light. On the other hand, in the region of the first supplemental electrode 14 vicinity, the difference between the voltages of the first supplemental electrode and the opposing electrode 21 is small (e.g., there is no difference between the voltages). In this region, the initial alignment (e.g., the horizontal alignment) or an alignment near the initial alignment is formed. The refractive index of this region for light oscillating in the X-axis direction approaches the refractive index (ne) for extraordinary light. Thereby, the refractive index distribution is formed in the liquid crystal layer 30. A refractive index distribution having a two-step Fresnel lens-like configuration (having two jump portions) is formed by these electrodes (the first electrode 11, the second electrode 12, the third electrode 13, the first supplemental electrode 14, and the second supplemental electrode 15). In the example, the number of the jumps of the refractive index of the refractive index distribution is two. In the embodiment, the number of the jumps may be three or more.

The liquid crystal layer 30 includes, for example, a first portion 31 and a second portion 32. The first portion 31 is positioned between the first supplemental electrode 14 and the opposing electrode 21. The second portion 32 is positioned between the second supplemental electrode 15 and the opposing electrode 21. In the example, the effective refractive index of at least a portion of the first portion 31 is higher than the effective refractive index of the second portion 32.

The liquid crystal optical device 111 functions as a liquid crystal GRIN lens (Gradient Index lens) in which the refractive index changes in the plane. A lens that has optical characteristics having a lenticular configuration is formed in the liquid crystal optical device 111. In the liquid crystal optical device 111, the operating state in which the optical path is modified is formed when, for example, the voltage is applied; and the operating state in which the optical path is substantially not modified is obtained when the voltage is not applied.

According to investigations of the inventor of the application, it was found that alignment defects occur easily in the liquid crystal layer 30 at the Fresnel electrode vicinity according to the positions of the lens edge electrodes, the positions of the Fresnel electrodes, the voltages of the lens edge electrodes, the voltages of the Fresnel electrodes, etc. The alignment defects are, for example, disclinations. When the disclinations occur, the desired state can no longer be obtained even for the configuration of the refractive index distribution at portions where the disclinations do not occur. Therefore, the desired lens characteristics are not obtained.

In such a case as described below, for example, when the first distance d1 is longer than the second distance d2 as recited above, the alignment defects can be suppressed by setting the difference between the absolute value of the first potential difference and the absolute value of the second potential difference to be larger than the difference between the absolute value of the second potential difference and the absolute value of the third potential difference.

Figure 3:
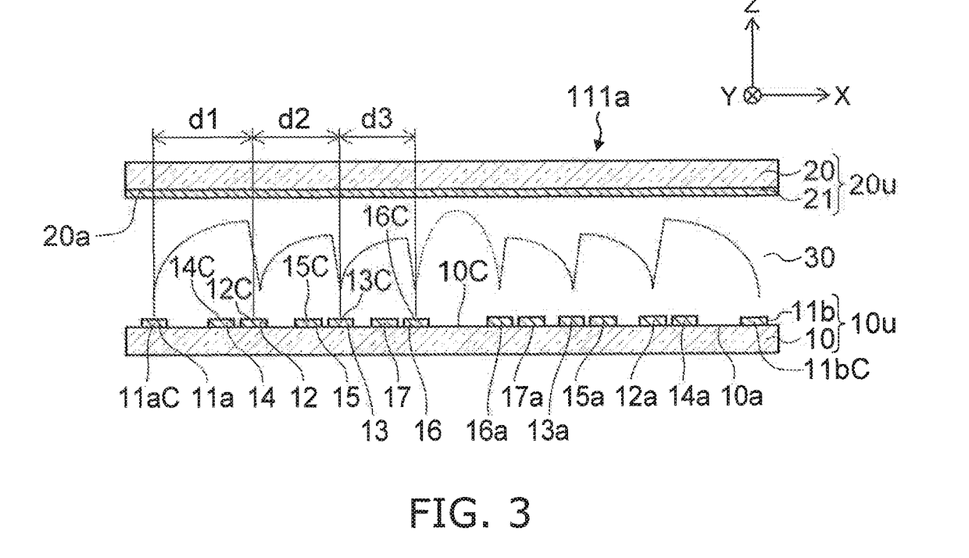
FIG. 3 is a schematic view illustrating another liquid crystal optical device according to the first embodiment.

FIG. 3 is a schematic view illustrating another liquid crystal optical device according to the first embodiment.

In the liquid crystal optical device 111a according to the embodiment as shown in FIG. 3, a fourth electrode 16 and a third supplemental electrode 17 are further provided in addition to the first electrode 11, the second electrode 12, the third electrode 13, the first supplemental electrode 14, and the second supplemental electrode 15 recited above. The fourth electrode 16 and the third supplemental electrode 17 are provided on the first surface 10a. The fourth electrode 16 and the third supplemental electrode 17 extend, for example, in the Y-axis direction. The fourth electrode 16 and the third supplemental electrode 17 are included in the first substrate unit 10u. The third supplemental electrode 17 is provided between the third electrode 13 and the fourth electrode 16.

For example, the fourth electrode 16 is used as a Fresnel electrode. The third supplemental electrode 17 is used as an auxiliary electrode.

In the example, the first substrate unit 10u further includes a seventh electrode 16a and a sixth supplemental electrode 17a. The seventh electrode 16a is provided between the sixth electrode 13a and the midpoint 10C. The sixth supplemental electrode 17a is provided between the sixth electrode 13a and the seventh electrode 16a.

For example, the seventh electrode 16a is used as a Fresnel electrode. The sixth supplemental electrode 17a is used as an auxiliary electrode.

In the liquid crystal optical device 111a, the number of the jumps of the Fresnel lens is three.

The driver 77 (not shown in FIG. 3) is further electrically connected to the fourth electrode 16, the third supplemental electrode 17, the seventh electrode 16a, and the sixth supplemental electrode 17a.

The driver 77 further sets the fourth electrode 16 to the fourth potential. The driver 77 sets the third supplemental electrode 17 to a third supplemental potential.

For example, the distance (the second distance d2) along the X-axis direction between the second center 12C in the X-axis direction of the second electrode 12 and the third center 13C in the X-axis direction of the third electrode 13 is longer than the distance (a third distance d3) between the third center 13C and a fourth center 16C in the X-axis direction of the fourth electrode 16.

In such a case, in the liquid crystal optical device 111a, the driver 77 sets the difference between the absolute value of the second potential difference between the second potential and the opposing potential and the absolute value of the third potential difference between the third potential and the opposing potential to be larger than the difference between the absolute value of the third potential difference and the absolute value of the fourth potential difference between the fourth potential and the opposing potential.

As described below, the alignment defects can be suppressed by such a disposition of the electrodes and such voltages.

In the liquid crystal optical device 111a as well, the first distance d1 is longer than the second distance d2. In such a case, for example, as described above, the difference between the absolute value of the first potential difference and the absolute value of the second potential difference is set to be larger than the difference between the absolute value of the second potential difference and the absolute value of the third potential difference. Thereby, the alignment defects can be suppressed further.

Figure 4:
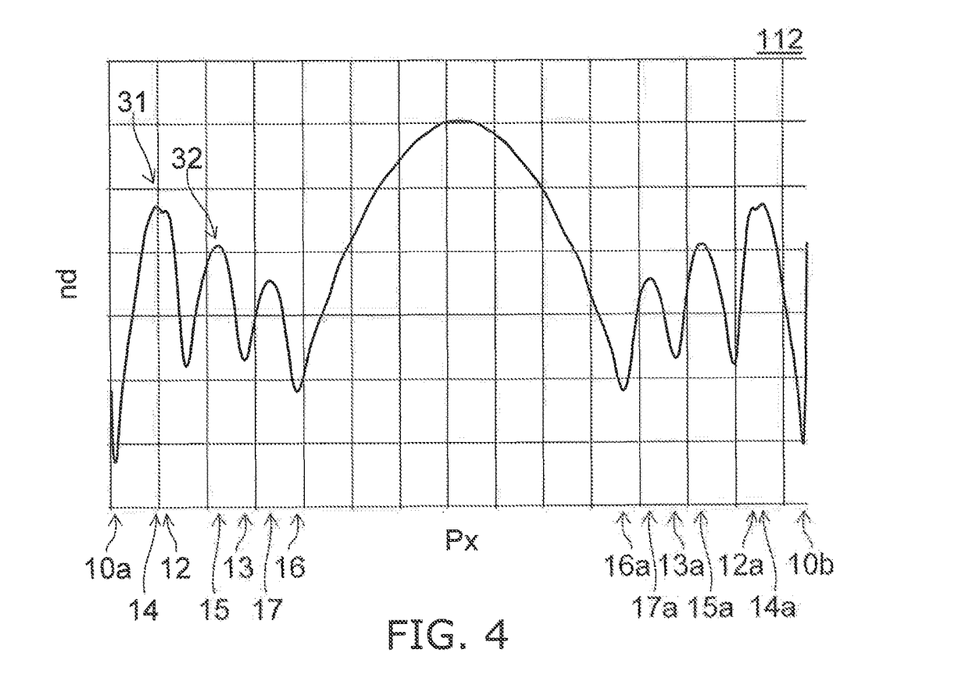
FIG. 4 is a graph of a characteristic of the liquid crystal optical device according to the first embodiment.

FIG. 4 is a graph of a characteristic of the liquid crystal optical device according to the first embodiment.

FIG. 4 shows simulation results of the refractive index distribution of the liquid crystal layer 30 of the liquid crystal optical device 111a.

Figure 5:
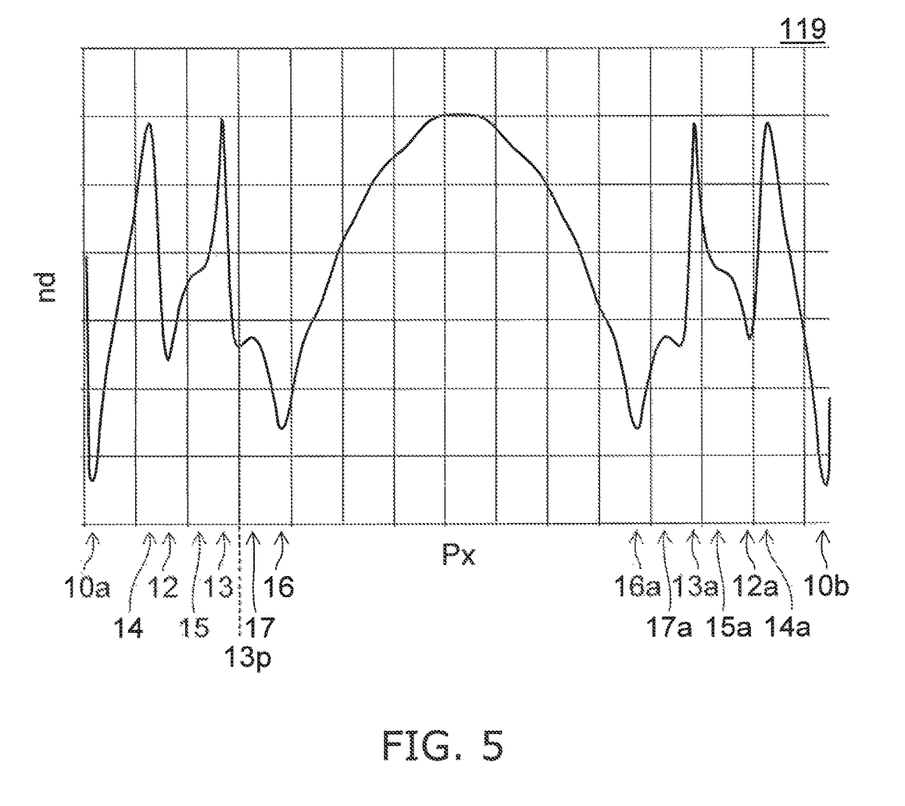
FIG. 5 is a graph of a characteristic of a liquid crystal optical device of a reference example.

FIG. 5 is a graph of a characteristic of a liquid crystal optical device of a reference example.

FIG. 5 shows simulation results of the refractive index distribution of the liquid crystal layer 30 of the liquid crystal optical device 119 of the reference example.

In the liquid crystal optical device 111a, the distance (the first distance d1) between the first center 11aC and the second center 12C is 80 µm. The distance (the second distance d2) between the third center 13C and the second center 12C is 40 µm. The distance (the third distance d3) between the fourth center 16C and the third center 13C is 40 µm.

On the other hand, in the liquid crystal optical device 119, the first distance d1 is 40 µm. The second distance d2 is 80 µm; and the third distance d3 is 80 µm. In other words, in the liquid crystal optical device 119, the first distance d1 between the center of the first electrode 11 and the center of the second electrode is shorter than the second distance d2 between the center of the second electrode 12 and the center of the third electrode 13. Otherwise, the configuration is similar to that of the liquid crystal optical device 112.

In FIG. 4 and FIG. 5, the horizontal axis is an X-axis direction position Px. In FIG. 4 and FIG. 5, the vertical axis is an optical parameter value nd. The optical parameter value nd is the product of the effective refractive index inside the liquid crystal layer 30 and the thickness of the liquid crystal layer 30. In the example, the change of the optical parameter value nd corresponds to the change of the effective refractive index because the thickness is constant. The effective refractive index changes due to the voltage applied to the liquid crystal layer 30. A lens is formed by the change of the effective refractive index; and a change of the travel direction of the light occurs.

In the liquid crystal optical device 119 as shown in FIG. 5, disclinations occur at a position 13p corresponding to the third electrode 13. Accordingly, the refractive index distribution deforms from the desired configuration even inside the liquid crystal layer 30 at portions other than the position 13p corresponding to the third electrode 13.

On the other hand, in the liquid crystal optical device 111a according to the embodiment as shown in FIG. 4, the disclinations substantially do not occur. The deformation of the refractive index distribution is suppressed.

In the embodiment, the effective value of the voltage of the lens edge electrode (e.g., the first electrode 11) is set to be the largest. For example, an electric field distribution having concentric cylindrical configurations is generated by the lens edge electrode. It is considered that the occurrence of the disclinations is suppressed in the region of the Fresnel electrode vicinity proximal to the lens edge electrode by the electric field.

When reverse tilt occurs in which the tilt direction of the liquid crystal reverses, disclinations occur in the boundary between the region of the forward tilt and the region of the reverse tilt. In such a case, as described above, the tilt direction of the liquid crystal molecules can be controlled by the electric field by, for example, the lens edge electrode causing the electric field distribution recited above to occur. As a result, the occurrence of the reverse tilt can be suppressed.

For example, the reverse tilt does not occur easily in the region proximal to the lens edge electrode. For example, the reverse tilt occurs easily and the disclinations occur easily away from the lens edge electrode.

The occurrence of the reverse tilt is greatly affected by the voltage applied to the Fresnel electrode (e.g., the second electrode 12, the third electrode 13, the fourth electrode 16, etc.). The reverse tilt does not occur easily proximal to the lens edge electrode even when the voltage is set to be high. The effective value of the voltage is set to be smaller away from the lens edge electrode. Thereby, the occurrence of the reverse tilt can be suppressed for the entire lens.

In the embodiment as described above, the relationship between the distance between the electrodes (the distance between the centers) and the magnitudes of the voltages is appropriately set for the relationship between the adjacent Fresnel electrodes and the relationship between the lens edge electrode and the Fresnel electrode adjacent to the lens edge electrode.

For the effective value of the voltage of each of electrodes with respect to the opposing electrode, the difference between the effective values of the voltages for the adjacent electrode is set to be larger as the distance to the adjacent electrode increases. Thereby, the occurrence of the disclinations at the Fresnel electrode vicinity is suppressed. Also, the deformation of the refractive index distribution is suppressed even at portions other than the disclination portions. Thereby, the effects of a Fresnel lens having the desired characteristics can be obtained. Such effects are obtained for the liquid crystal optical devices 111 and 111a. According to the liquid crystal optical devices 111 and 111a and the image display device 211 according to the embodiment, a high-quality display can be provided.

Examples of characteristics of liquid crystal optical devices will now be described.

Figure 6:
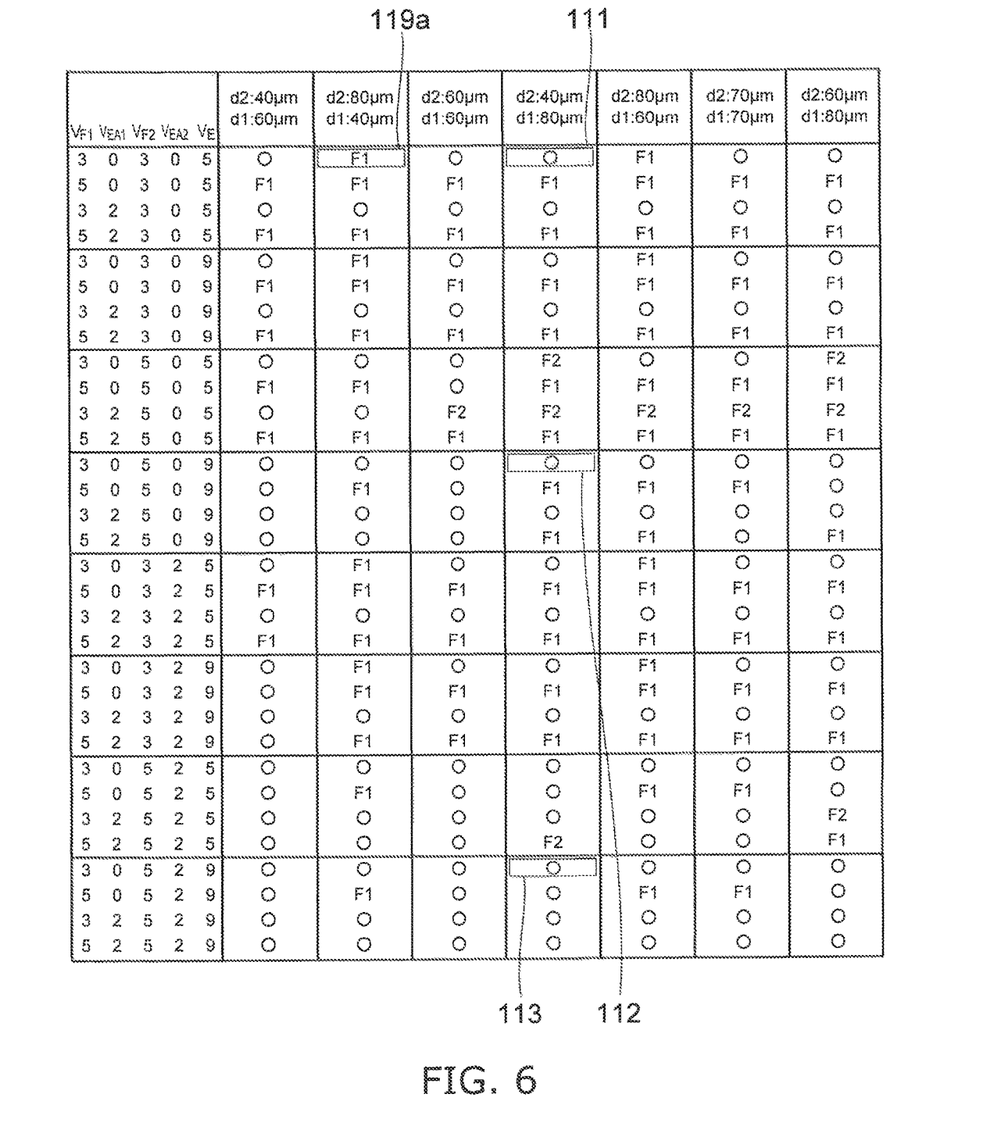
FIG. 6 is a table illustrating the characteristics of the liquid crystal optical devices.

FIG. 6 is a table illustrating the characteristics of the liquid crystal optical devices.

FIG. 6 shows simulation results of the occurrence/non-occurrence of the disclinations when the voltages (the set potentials) applied to the electrodes and the positions of the electrodes are changed.

In the example shown in FIG. 6, the distance between the centers of the electrodes and the voltages applied to the electrodes are modified for a configuration similar to that of the liquid crystal optical device 111.

In the example of FIG. 6, the voltage of the opposing electrode 21 is set to be 0 V. A voltage VF1 is the voltage applied to the third electrode 13. A voltage VEA1 is the voltage applied to the second supplemental electrode 15. A voltage VF2 is the voltage applied to the second electrode 12. A voltage VEA2 is the voltage applied to the first supplemental electrode 14. A voltage VE is the voltage applied to the first electrode 11.

In FIG. 6, the first distance d1 (the distance between the second center 12C and the third center 13C) and the second distance d2 (the distance between the first center 11aC and the second center 12C) are modified.

In FIG. 6, the "○" symbol indicates that disclinations do not occur. The "F1" symbol indicates that disclinations occur in the liquid crystal layer 30 at the third electrode 13 vicinity. The "F2" symbol indicates that disclinations occur in the liquid crystal layer 30 at the second electrode 12 vicinity.

For example, the conditions of the first distance d1 being 80 μm, the second distance d2 being 40 μm, the voltage VF1 being 3 V, the voltage VEA1 being 0 V, the voltage VF2 being 3 V, the voltage VEA2 being 0 V, and the voltage VE being 5 V correspond to the liquid crystal optical device 111.

For example, the conditions of the first distance d1 being 80 μm, the second distance d2 being 40 μm, the voltage VF1 being 3 V, the voltage VEA1 being 0 V, the voltage VF2 being 5 V, the voltage VEA2 being 0 V, and the voltage VE being 9 V correspond to the liquid crystal optical device 112.

For example, the conditions of the first distance d1 being 80 μm, the second distance d2 being 40 μm, the voltage VF1 being 3 V, the voltage VEA1 being 0 V, the voltage VF2 being 5 V, the voltage VEA2 being 2 V, and the voltage VE being 9 V correspond to the liquid crystal optical device 113.

For example, the conditions of the first distance d1 being 40 μm, the second distance d2 being 80 μm, the voltage VF1 being 3 V, the voltage VEA1 being 0 V, the voltage VF2 being 3 V, the voltage VEA2 being 0 V, and the voltage VE being 5 V correspond to the liquid crystal optical device 119a.

As shown in FIG. 6, the disclinations do not occur in the liquid crystal optical devices 111, 112, and 113. On the other hand, in the liquid crystal optical device 119a, the disclinations occur in the liquid crystal layer 30 at the third electrode 13 vicinity.

In the liquid crystal optical devices 111, 112, and 113, the first distance d1 (the distance between the first center 11C and the second center 12C of the second electrode 12) is longer than the second distance d2 (the distance between the second center 12C and the third center 13C of the third electrode 13).

In such a case, in these liquid crystal optical devices, the difference between the absolute value of the first potential difference between the first potential and the opposing potential and the absolute value of the second potential difference between the second potential and the opposing potential is set to be larger than the difference between the absolute value of the second potential difference and the absolute value of the third potential difference between the third potential and the opposing potential. Such voltages are set by the driver 77.

In the liquid crystal optical device 112, the absolute value of the first potential difference is greater than the absolute value of the second potential difference and greater than the absolute value of the third potential difference. The absolute value of the second potential difference is greater than the absolute value of the third potential difference. By such conditions, for example, the occurrence of the reverse tilt is suppressed by the electric field generated by the lens edge electrode. As a result, the occurrence of the disclinations is suppressed.

In the liquid crystal optical device 112, the distance between the lens edge electrode and the Fresnel electrode adjacent to the lens edge electrode is longer than the distance between the Fresnel electrode and the Fresnel electrode disposed at a position further away from the lens edge electrode. For example, the effective value of the voltage applied between the opposing electrode 21 and the lens edge electrode is set to be the largest. The effective value of the voltage applied between the opposing electrode 21 and the Fresnel electrode decreases as the distance from the lens edge electrode increases. Thereby, the occurrence of the reverse tilt is suppressed; and the occurrence of the disclinations is suppressed.

In the liquid crystal optical device 113, the difference between the absolute value of the second potential difference and the absolute value of the difference (the first supplementary difference) between the first supplemental potential and the opposing potential is set to be larger than the difference between the absolute value of the third potential difference and the absolute value of the difference (the second supplementary difference) between the second supplemental potential and the opposing potential. The absolute value of the first supplementary difference is greater than the absolute value of the second supplementary difference.

The auxiliary electrode is disposed to be proximal to the electrode that has the smaller effective value of the voltage among the Fresnel electrodes or lens edge electrodes that are adjacent to each other. For example, the effective value of the voltage applied between the opposing electrode 21 and the auxiliary electrode is set to decrease as the distance from the auxiliary electrode to the lens edge electrode increases. For example, the difference between the effective values of the voltages of the Fresnel electrode and the auxiliary electrode that are adjacent to each other is set to decrease as the distance from the lens edge electrode increases. Thereby, the occurrence of the reverse tilt is suppressed. The occurrence of the disclinations is suppressed.

For example, the absolute value of the first supplementary difference (the difference between the first supplemental potential and the opposing potential) is set to be less than the absolute value of the second potential difference. For example, the absolute value of the second supplementary difference (the difference between the second supplemental potential and the opposing potential) is set to be less than the absolute value of the third potential difference. Thereby, the appropriate refractive index distribution is formed easily.

Also, the settings may be as follows. In the case where the first distance d1 is shorter than the second distance, the difference between the absolute value of the first potential difference between the first potential and the opposing potential and the absolute value of the second potential difference between the second potential and the opposing potential is set to be smaller than the difference between the absolute value of the second potential difference and the absolute value of the third potential difference between the third potential and the opposing potential. By such conditions as well, the occurrence of the reverse tilt is suppressed; and the occurrence of the disclinations is suppressed.

Further, in the case where the refractive index distribution has three jumps (e.g., the liquid crystal optical device 111a or the like), the settings may be as follows. In such a case, the fourth electrode 16 is further provided. In such a case, for example, the second distance d2 (the distance along the X-axis direction between the second center 12C in the X-axis direction of the second electrode 12 and the third center 13C in the X-axis direction of the third electrode 13) is set to be longer than the third distance d3 (the distance along the X-axis direction between the third center 13C and the first supplemental center 14C in the X-axis direction of the fourth electrode 16). In such a case, the driver 77 sets the difference between the absolute value of the second potential difference between the second potential and the opposing potential and the absolute value of the third potential difference between the third potential and the opposing potential to be larger than the difference between the absolute value of the third potential difference and the absolute value of the fourth potential difference between the fourth potential and the opposing potential.

Or, the settings may be as follows. For example, the second distance d2 is set to be shorter than the third distance d3. In such a case, the driver 77 sets the difference between the absolute value of the second potential difference between the second potential and the opposing potential and the absolute value of the third potential difference between the third potential and the opposing potential to be smaller than the difference between the absolute value of the third potential difference and the absolute value of the fourth potential difference between the fourth potential and the opposing potential.

Thereby, even in the case where the refractive index distribution has three jumps, the occurrence of the disclinations can be suppressed.

Second Embodiment

Figure 7:
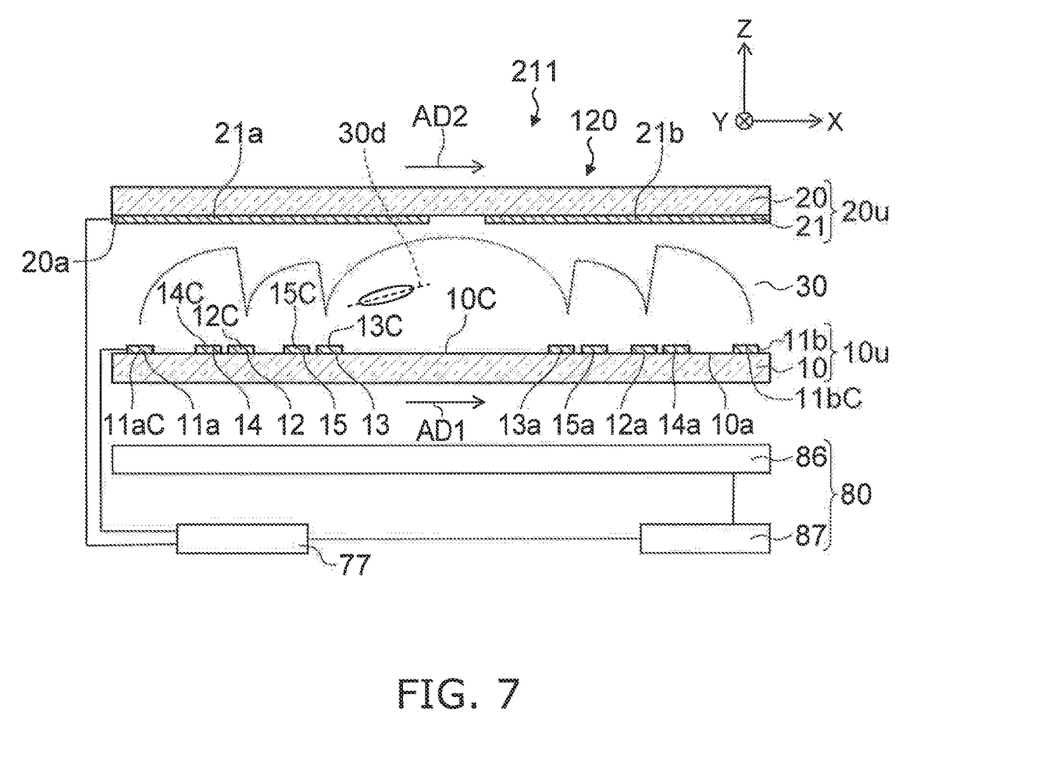
FIG. 7 is a schematic view illustrating a liquid crystal optical device according to a second embodiment.

FIG. 7 is a schematic view illustrating a liquid crystal optical device according to a second embodiment.

As shown in FIG. 7, the first substrate unit 10u, the second substrate unit 20u, the liquid crystal layer 30, and the driver 77 are provided in the liquid crystal optical device 120 as well. In the liquid crystal optical device 120, the opposing electrode 21 includes a first opposing portion 21a and a second opposing portion 21b. Otherwise, configurations and materials that are similar to those described in regard to the liquid crystal optical device 111 are applied to the liquid crystal optical device 120. In the example, the first opposing portion 21a opposes the first electrode 11a, the second electrode 12, the third electrode 13, the first supplemental electrode 14, and the second supplemental electrode 15. On the other hand, the second opposing portion 21b opposes the first electrode 11b, the fifth electrode 12a, the sixth electrode 13a, the fourth supplemental electrode 14a, and the fifth supplemental electrode 15a. For example, the second opposing portion 21b is separated from the first opposing portion 21a in the X-axis direction.

For example, the driver 77 sets the first opposing portion 21a to a first opposing potential and sets the second opposing portion 21b to a second opposing potential. Thereby, the voltage that is applied to the liquid crystal layer 30 is easier to control. The distribution of the refractive index of the liquid crystal layer 30 is easier to control.

Opposing portions such as the first opposing portion 21a and the second opposing portion 21b recited above may be provided in any liquid crystal optical device (e.g., the liquid crystal optical devices 111a, 112, 113, etc.) described in the first embodiment and liquid crystal optical devices of modifications of any liquid crystal optical device described in the first embodiment.

According to the embodiment, a liquid crystal optical device and an image display device having high-quality optical characteristics are provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the embodiments of the invention are not limited to these specific examples. For example, one skilled in the art may similarly practice the invention by appropriately selecting specific configurations of components such as the first substrate unit, the first substrate, the first to sixth electrodes, the supplemental electrode, the second substrate unit, the opposing electrode, the second substrate, the liquid crystal layer, the driver, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all liquid crystal optical devices and image display devices practicable by an appropriate design modification by one skilled in the art based on the liquid crystal optical devices and the image display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical device, comprising:
   a first substrate unit including
      a first substrate having a first surface,
      a plurality of first electrodes provided on the first surface and arranged in a first direction,
      a second electrode provided between one electrode of most proximal first electrodes of the plurality of first electrodes and a midpoint of a line segment, the line segment connecting a first center in the first direction of the one electrode and a center in the first direction of other electrode of the most proximal first electrodes, and
      a third electrode provided between the second electrode and the midpoint;
   a second substrate unit including
      a second substrate having a second surface opposing the first surface, and
      an opposing electrode provided on the second surface;
   a liquid crystal layer provided between the first substrate unit and the second substrate unit; and
   a driver that sets the opposing electrode to an opposing potential, sets each of the plurality of first electrodes to a first potential, sets the second electrode to a second potential, and sets the third electrode to a third potential,
   wherein
   a first distance along the first direction between the first center and a second center in the first direction of the second electrode is longer than a second distance along the first direction between the second center and a third center in the first direction of the third electrode,
   a difference between an absolute value of a first potential difference and an absolute value of a second potential difference is larger than a difference between the absolute value of the second potential difference and an absolute value of a third potential difference, the first potential difference is a difference between the first potential and the opposing potential, the second potential difference is a difference between the second potential and the opposing potential, and the third potential difference is a difference between the third potential and the opposing potential.

2. The device according to claim 1, wherein the absolute value of the first potential difference is greater than the absolute value of the second potential difference and is greater than the absolute value of the third potential difference.

3. The device according to claim 1, wherein the absolute value of the second potential difference is greater than the absolute value of the third potential difference.

4. The device according to claim 1, wherein
the first substrate unit further includes:
a first supplemental electrode provided between the one electrode and the second electrode; and
a second supplemental electrode provided between the second electrode and the third electrode.

5. The device according to claim 4, wherein
the driver sets the first supplemental electrode to a first supplemental potential and sets the second supplemental electrode to a second supplemental potential,
the driver sets an absolute value of a first supplementary difference between the first supplemental potential and the opposing potential to be less than the absolute value of the second potential difference, and
the driver sets an absolute value of a second supplementary difference between the second supplemental potential and the opposing potential to be less than the absolute value of the third potential difference.

6. The device according to claim 4, wherein
the driver sets the first supplemental electrode to a first supplemental potential and sets the second supplemental electrode to a second supplemental potential, and
a difference between the absolute value of the second potential difference and an absolute value of a first supplementary difference between the first supplemental potential and the opposing potential is larger than a difference between the absolute value of the third potential difference and an absolute value of a second supplementary difference between the second supplemental potential and the opposing potential.

7. The device according to claim 6, wherein the absolute value of the first supplementary difference is greater than the absolute value of the second supplementary difference.

8. The device according to claim 5, wherein an absolute value of the first supplemental potential is greater than an absolute value of the opposing potential.

9. The device according to claim 4, wherein a distance between the first center and a first supplemental center in the first direction of the first supplemental electrode is longer than a distance between the first supplemental center and the second center.

10. The device according to claim 4, wherein a length along the first direction of the second supplemental electrode is shorter than a length along the first direction of the first supplemental electrode.

11. The device according to claim 4, wherein a length along the first direction of the second electrode is shorter than a length along the first direction of the first supplemental electrode.

12. The device according to claim 4, wherein the first electrode, the second electrode, the third electrode, the first supplemental electrode, and the second supplemental electrode extend along a second direction intersecting the first direction.

13. The device according to claim 1, wherein a length along the first direction of the third electrode is shorter than a length along the first direction of the second electrode.

14. The device according to claim 1, wherein an angle between the first direction and a long-axis direction of liquid crystal molecules included in the liquid crystal layer is smaller than an angle between the long-axis direction and a second direction intersecting the first direction.

15. The device according to claim 1, wherein the first electrode includes an oxide including at least one element of indium, tin, zinc, and titanium.

16. An image display device, comprising:
the device according to claim 1; and
a display unit stacked with the liquid crystal optical device,
wherein the display unit causes light including image information to be incident on the liquid crystal layer.

17. A liquid crystal optical device, comprising:
a first substrate unit including
a first substrate having a first surface,
a plurality of first electrodes provided on the first surface and arranged in a first direction,
a second electrode provided between one electrode of most proximal first electrodes of the plurality of first electrodes and a midpoint of a line segment, the line segment connecting a first center in the first direction of the one electrode and a center in the first direction of the other electrode of the most proximal first electrodes,
a third electrode provided between the second electrode and the midpoint, and
a fourth electrode provided between the third electrode and the midpoint;
a second substrate unit including
a second substrate having a second surface opposing the first surface, and
an opposing electrode provided on the second surface;
a liquid crystal layer provided between the first substrate unit and the second substrate unit; and
a driver that sets the opposing electrode to an opposing potential, setting each of the plurality of first electrodes to a first potential, setting the second electrode to a second potential, setting the third electrode to a third potential, and setting the fourth electrode to a fourth potential,
wherein
a second distance along the first direction between a second center in the first direction of the second electrode and a third center in the first direction of the third electrode is longer than a third distance along the first direction between the third center and a fourth center in the first direction of the fourth electrode,
a difference between an absolute value of a second potential difference and an absolute value of a third potential difference is larger than a difference between the absolute value of the third potential difference and an absolute value of a fourth potential difference,
the second potential difference is a difference between the second potential and the opposing potential,
the third potential difference is a difference between the third potential and the opposing potential, and
the fourth potential difference is a difference between the fourth potential and the opposing potential.

18. The device according to claim 17, wherein the first substrate unit further includes a third supplemental electrode provided between the third electrode and the fourth electrode.

19. A liquid crystal optical device, comprising;
a first substrate unit including
   a first substrate having a first surface,
   a plurality of first electrodes provided on the first surface and arranged in a first direction,
   a second electrode provided between one electrode of most proximal first electrodes of the plurality of first electrodes and a midpoint of a line segment, the line segment connecting a first center in the first direction of the one electrode and a center in the first direction of the other electrode of the most proximal first electrodes,
   a third electrode provided between the second electrode and the midpoint,
   a first supplemental electrode provided between the one electrode and the second electrode, and
   a second supplemental electrode provided between the second electrode and the third electrode;
a second substrate unit including
   a second substrate having a second surface opposing the first surface, and
   an opposing electrode provided on the second surface;
a liquid crystal layer provided between the first substrate unit and the second substrate unit; and
a driver that sets the opposing electrode to an opposing potential, sets each of the plurality of first electrodes to a first potential, sets the second electrode to a second potential, and sets the third electrode to a third potential,
wherein
the liquid crystal layer includes a first portion and a second portion,
the first portion is provided between the first supplemental electrode and the opposing electrode, and
the second portion is provided between the second supplemental electrode and the opposing electrode, and
a refractive index of at least a portion of the first portion is higher than a refractive index of the second portion.

* * * * *